(12) United States Patent
Unger

(10) Patent No.: US 7,092,616 B2
(45) Date of Patent: Aug. 15, 2006

(54) METHOD AND APPARATUS FOR COPY PROTECTING VIDEO CONTENT AND PRODUCING A REDUCED QUALITY REPRODUCTION OF VIDEO CONTENT FOR PERSONAL USE

(75) Inventor: Robert Allan Unger, El Cajon, CA (US)

(73) Assignees: Sony Electronics Inc., Park Ridge, NJ (US); Sony Corporation, Tokyo (JP)

( * ) Notice: Subject to any disclaimer, the term of this patent is extended or adjusted under 35 U.S.C. 154(b) by 1129 days.

(21) Appl. No.: 09/909,765

(22) Filed: Jul. 19, 2001

(65) Prior Publication Data

US 2003/0016949 A1    Jan. 23, 2003

(51) Int. Cl.
*H04N 5/91* (2006.01)

(52) U.S. Cl. .................................................. 386/94

(58) Field of Classification Search ............... 386/94, 386/1; 360/60; 380/5, 10, 22
See application file for complete search history.

(56) References Cited

U.S. PATENT DOCUMENTS

| 4,577,216 | A | | 3/1986 | Ryan |
| 4,907,093 | A | | 3/1990 | Ryan |
| 5,130,810 | A | | 7/1992 | Ryan |
| 5,315,448 | A | | 5/1994 | Ryan |
| 5,889,919 | A | * | 3/1999 | Inoue et al. .................. 386/94 |

* cited by examiner

*Primary Examiner*—Thai Tran
*Assistant Examiner*—Mishawn Dunn
(74) *Attorney, Agent, or Firm*—Haverstock & Owens LLP

(57) ABSTRACT

A copy protection apparatus is disclosed for processing a video signal to produce normal quality video for display on a display device and so as to inhibit the making of high quality reproductions therefrom while allowing lower quality reproductions to be made. The apparatus includes a first signal modification element that alters a normal quality video signal to produce a first modified signal such that, if reproduced, an unusable video copy is produced, and wherein the first modified video signal, when output to a display device is viewable as normal quality video on the display device. The apparatus further includes a second signal modification element that degrades the video signal to produce a second video signal of reduced quality. This reduced quality signal can be output to a reproduction device for copying.

23 Claims, 6 Drawing Sheets

METHOD AND APPARATUS FOR COPY PROTECTING VIDEO CONTENT AND PRODUCING A REDUCED QUALITY REPRODUCTION OF VIDEO CONTENT FOR PERSONAL USE

TECHNICAL FIELD

The invention described herein relates to methods and apparatus for achieving copy protection in video systems. In particular, the invention relates to methods and apparatus for displaying high quality video content but making available for reproduction only a lower quality version of the content.

BACKGROUND

Conventional implementations of copy protection schemes generally work as follows. An encoded video signal is decoded to provide a "clean signal" which is then modified. By modifying certain characteristics of the clean video signal, a specific type of altered video signal is created. When the altered signal is displayed by a display device, it provides high quality video images. However, distortion is also introduced into the altered signal which does not affect its characteristics when displayed over a display device, such as a television set. However, when the same signal is output into another output device, such as a recording device (e.g., a VCR), the modifications made to the signal are sufficient to seriously degrade the output signal to the point where it is unusable, thereby preventing copying of the original video content.

Signals can be rendered unusable by a wide variety of approaches. Some common examples include, but are not limited to, blanking a display screen, introducing so much noise into the signal that it cannot be viewed, introducing flashes of light into the displayed images, reducing the picture resolution to a point where it is unviewable, skewing the color balance to an unwatchable level, introducing picture flaws which are irritating to watch thereby making them unviewable. These techniques, as well as many others known in the art, are used to render the signal completely unusable for viewing or reproduction.

Although the foregoing implementations have the advantage of preventing unauthorized copying of video content, they also have the disadvantage of completely preventing a user from producing personal use copies of his own content. One of the goals of the present invention is to maintain copy protection on existing video content while permitting the creation of "personal use" copies of the same content.

The present invention relates to improvements in digital content copy protection technology. One particular application of this technology is copy protection for digital video content. There exists a need for a method and system for modifying a video signal such that the signal produces a normal, full quality picture on a display device, but also prevents or inhibits the making of high quality reproductions of the original video signal. Secondly, there is a desire by consumers to make personal use copies of the original video signal, even at reduced quality levels. Therefore, there is a need for producing a modified video signal that enables lower quality reproductions of the original video signal to be made. The purpose of these low quality reproductions is to provide a user of video content with the ability to make a personal use copy of the video content. It should be a feature of the personal use copy that, although it is reasonably acceptable for personal viewing, the quality of the copy is such that there is a noticeable decline in signal quality. In particular, the personal use reproduction should be of low enough quality such that it is not salable to the public. Such a method and apparatus will provide the user with the ability to make personal use copies of video content but discourage copying of video content with the intent of committing wholesale piracy of the content.

FIG. 1 graphically depicts a "Horizontal Pixel Resolution Spectrum" which figuratively describes a quality spectrum for video content. As discussed herein, signal quality is synonymous with resolution. Pixel resolution refers to x and y (horizontal and vertical) coordinates with a z coordinate representing the number of bits per pixel (thereby defining color and brightness resolution). As is known in the art, different content formats and video signals can be used to provide different levels of signal resolution and quality. For example, digital television using newer HDTV formats can maintain a typical pixel resolution of 1920 pixels per line. Lower resolution digital television formats can maintain pixel resolutions of 1280 per line or 1440 per line. Typical analog television signals provide a somewhat lower picture quality. For example, resolutions on the order of 720 pixels per line are common. Lower resolutions of 350 to 480 pixels per line are also common. Typical broadcast quality video signal ranges from 400–500 pixels per line and VCR quality signal ranges from 200–400 pixels per line. This spectrum of resolution quality continues to decline until it reaches a level which is essentially worthless and contains no discernible video signal at all.

Moreover, parameters other than pixels per line can be used to define picture quality. Other parameters like sharpness, contrast, brightness, tint, motion continuity, as well as other related parameters, are important to picture quality. Also, content quality is dependent on audio quality. Therefore, a multitude of parameters affect the content quality.

SUMMARY OF THE INVENTION

Accordingly, an embodiment of the present invention includes an apparatus for processing a video signal to produce normal quality video for display on a display device and which also inhibits the making of high quality reproductions therefrom while allowing lower quality reproductions to be made. The apparatus includes a first signal modification element that alters the video signal to produce a first modified video signal that is viewable as normal quality video on the display device. Whereas the first modified video signal, produces video copies of an unusable quality. The apparatus further includes a second signal modification element which alters the video signal to produce a degraded second video signal of reduced quality that can be reproduced using a reproduction device.

In another embodiment the apparatus includes a video decoder for decoding a video signal to provide a clean video signal. The clean video signal is supplied to a first signal modification element which alters the clean video signal to produce a first modified video signal which is of unusable quality when output. Also, the first modified video signal is viewable as high quality video when displayed on a display device. The clean video signal is also supplied to a second signal modification element which alters the clean video signal such that a reduced quality degraded version of the content is produced. This reduced quality degraded version of the content can be output for reproduction. A related embodiment uses a second signal modification element that includes a signal quality reducing means for altering the clean video signal to produce a signal having reduced signal quality.

Another embodiment includes a method for processing a video signal so that it produces a normal quality picture on a display device but produces a reduced quality copy when reproduced using a reproduction device. The method includes providing a clean video signal, first modifying the clean video signal to produce a first modified signal that is of unusable quality when output for reproduction and is viewable as high quality video when output to a display device, and second modifying the clean video signal to produce a degraded second modified signal having reduced signal quality when output for reproduction.

Other features of the present invention are set forth in the section entitled: "DETAILED DESCRIPTION OF THE DRAWINGS".

BRIEF DESCRIPTION OF THE DRAWINGS

For a fuller understanding of the present invention, reference is made to the accompanying drawings in the following Detailed Description. In the drawings.

Reference numbers refer to the same or equivalent structural elements throughout the several figures of the drawings.

DETAILED DESCRIPTION OF THE DRAWINGS

Figure 1:
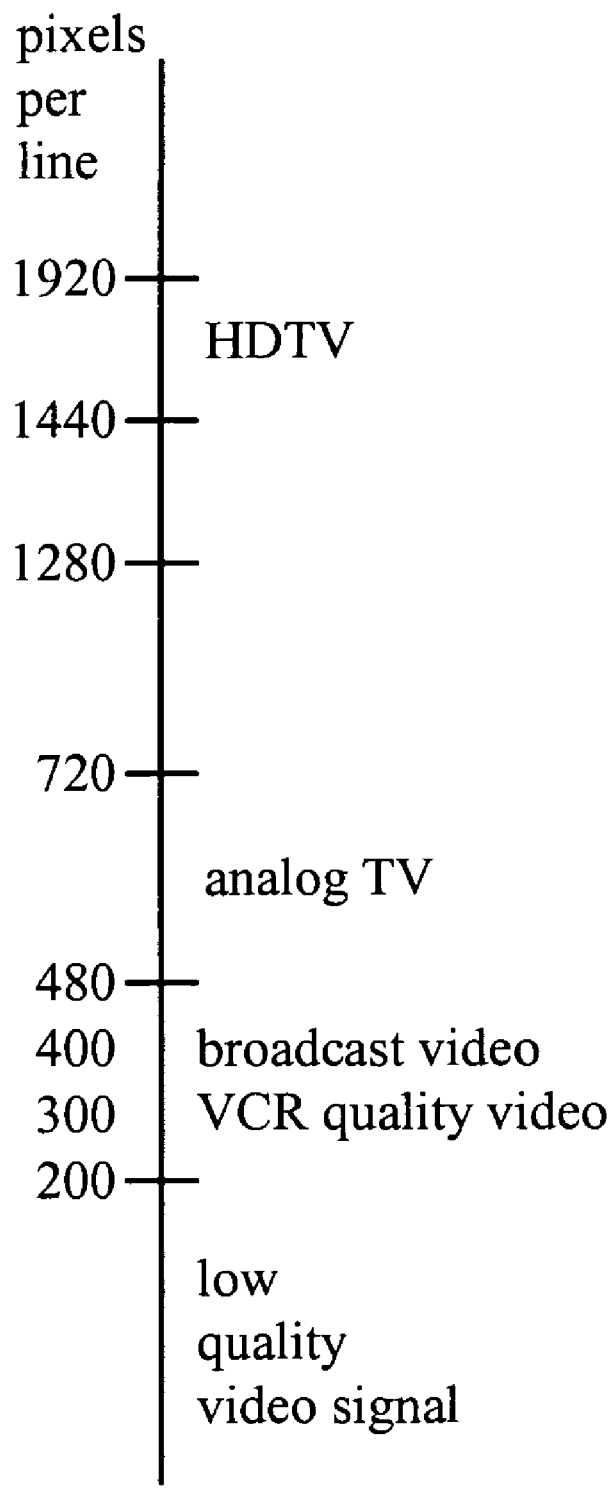
FIG. 1 is a diagram showing a horizontal pixel resolution spectrum which presents a spectrum of picture resolution of various display formats.
Figure 2:
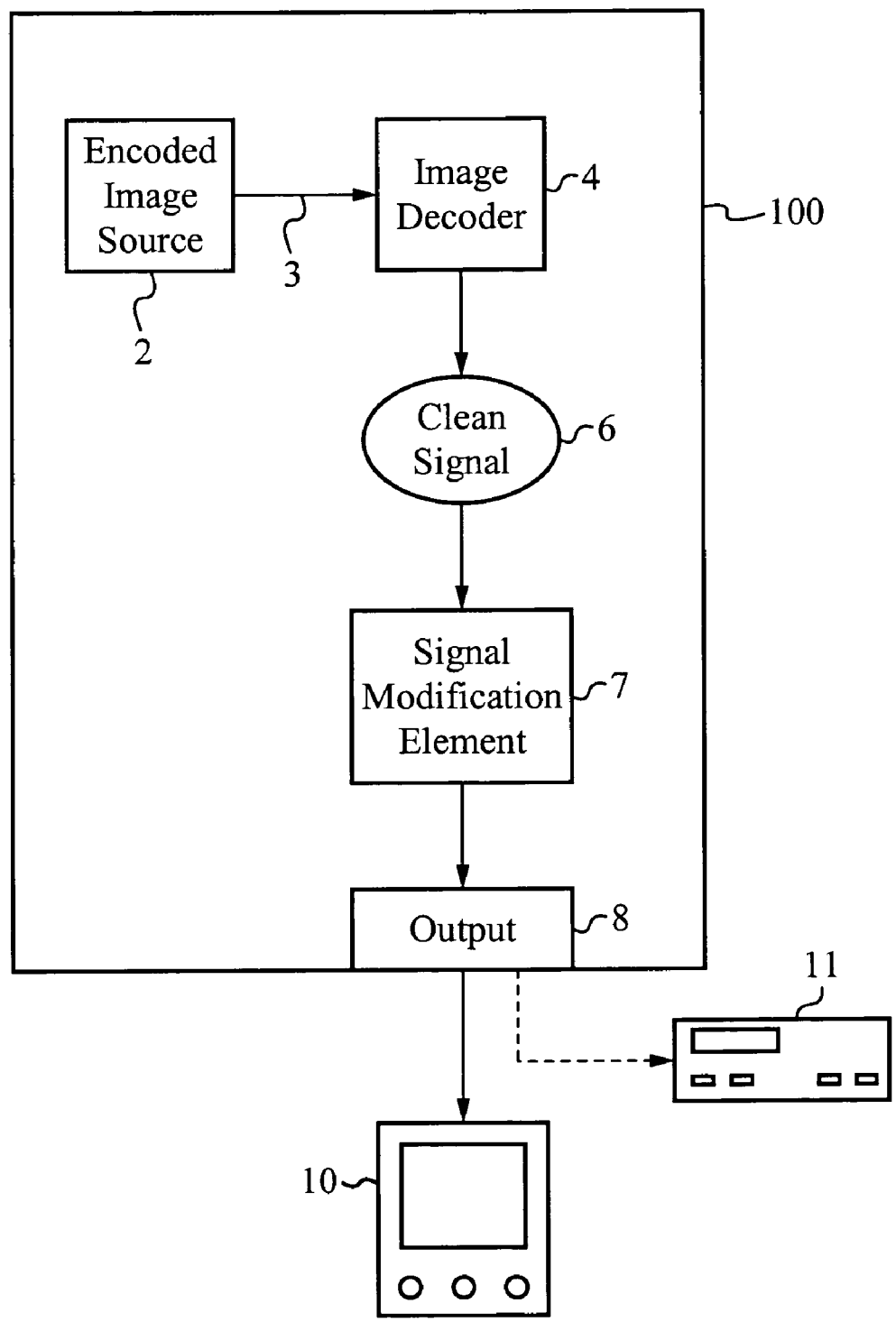
FIG. 2 is a block diagram of a conventional copy protection scheme

FIG. 2 describes a simplified version of a conventional implementation of an apparatus for processing video signals to inhibit the making of videotape recordings of acceptable, salable quality. An encoded video signal is provided by any of a number of sources. Examples of typical content delivery sources include, but are not limited to, DVD players, VCR devices, set-top boxes, as well as other devices which can receive video signal delivered over the airwaves, through broadband cable, or via satellite. Other content delivery sources of particular interest include internet provided content or content stored on the hard drive of a computer system. Other sources of content can include audio sources, such as radio stations or cable audio broadcasts. In the depicted embodiment, video signals are provided to the apparatus 100. These signals can be provided by an external source (e.g., the internet or other content delivery source) or generated by the device itself (e.g., the device 100 is a DVD player, VCR, set-top box, or other such device). Typically, the content is provided in an encoded form. The encoded signal is then decoded into signals which can be displayed by display devices. In one typical example, a video signal can be encoded using an MPEG encoding and decoding scheme. In such schemes, image data is provided by an image input device, then compressed, and encoded by, for example, a video encoder. Quantization processes and DCT (discrete cosine transform) are usually involved in encoding. Encoded data can be written into a record medium. Typical record medium include, but are not limited to, VCR tape or DVD.

Decoding follows a reverse process: data is read from the record medium and decoded by, for example, a video decoder. Decoding is preceded by a reverse quantization process and reverse DCT. Image data decoded by the video decoder is output in a displayable format at displayable timing and reproduced and displayed by a display device.

FIG. 2 is a block diagram of a conventional system 100. An encoded image source 2 provides an encoded image signal 3 which is received by a decoder 4. The decoder 4 decodes the signal and converts it into a usable format referred to herein as a clean signal 5. In a conventional copy protected device, this clean signal 5 is then modified by a signal modification element 7, which changes the signal in a manner which allows a display device 10 to produce a normal picture, but the modifications also change the signal in a way which causes a reproduction device 11 to produce copies of the video content which are of unacceptable quality. This modified video signal can then output to output devices 10, 11. Output devices include, but are not limited to, display devices such as televisions, digital televisions, high definition televisions (HDTV), computer displays or other display devices 10. Moreover, output devices can include reproduction devices such as VCR's 11 or other content reproduction devices (e.g., writeable CD devices, writeable DVD devices, etc.).

These basic concepts have been incorporated into numerous methods and apparatus for preventing the copying of video programs. Typical examples are illustrated in U.S. Pat. Nos. 4,577,216, 4,907,093, 5,315,448, 5,130,810, as well as others. One common copy protection approach is illustrated in U.S. Pat. No. 5,130,810. Such inventions typically modify a video signal by altering aspects of a normal "sync pulse" in a way so that a display device (including, but not limited to a television) produces a normal picture when displayed. However, the modified "synch pulse" wreaks havoc on the picture quality of a recording when a videotape recording of the same modified video signal is made. Such recordings are altered to the extent that they are largely unviewable. Such is the state of ordinary copy protection.

Figure 3A:
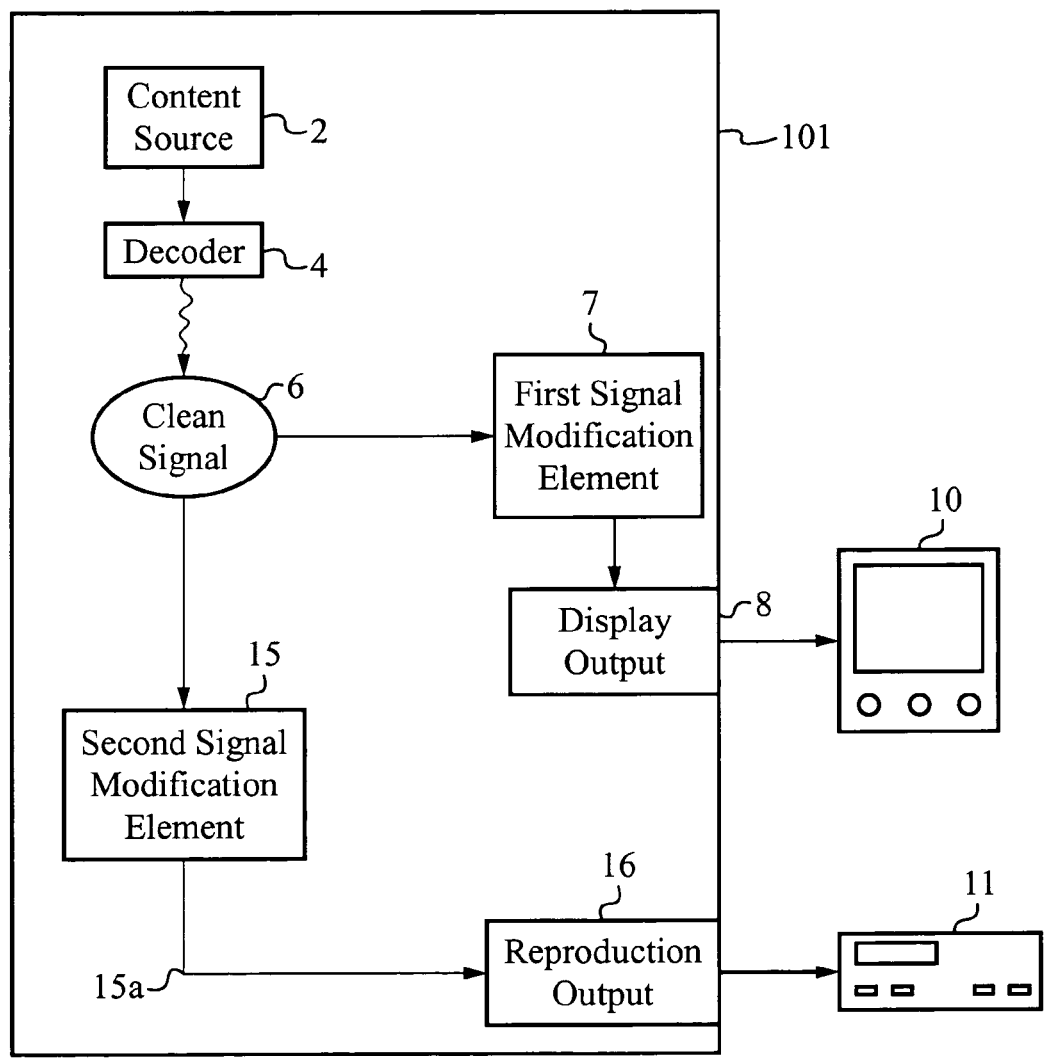
FIG. 3A is a block diagram of a copy protection embodiment constructed in accordance with the principles of the present invention.

An embodiment 101 of the present invention is depicted in FIG. 3A. The device depicted in FIG. 3A can include a content source 2, which provides encoded content to a decoder 4, which outputs a clean (decoded) signal 6. This clean signal is a high or normal quality video signal reproduced with all the resolution and fidelity of the original. Although the original encoded signal is depicted here as originating from within the embodiment 101, the encoded signal can be supplied by other sources (e.g., the internet, satellite, cable, radio, other devices or storage locations, etc.). The clean signal can be stored in a buffer or immediately forwarded for display or recording. The depicted embodiment shows the signal being forwarded to a first signal modification element 7, which modifies the signal to create a first modified signal. In the case of video content, the first modified signal is modified such that it can be viewed by a display device 10, but produces an unusable copy when recorded by a reproduction device 11. The inventors contemplate such a copy protection scheme can be applied to audio content as well. The first modified signal is output through a display output port 8, where it is input into a display device 10 for viewing (or in the case of audio content listening).

Additionally, and advantageously, the clean signal 6 is also forwarded to a second signal modification element 15, where it is subjected to a second type of signal modification to produce a degraded second modified signal, examples of which will be explained hereinbelow. The second signal modification element can include a signal quality reduction means for producing a lower quality video signal.

The second signal modification element 15 modifies the clean signal 6 to create a diminished quality second video signal which can be output to a reproduction device 11 (shown here being output to a reproduction output port 16, and connected to the reproduction device 1). For example, the original high quality signal can be resampled to produce video quality on par with that obtained by recording a standard VHS tape (e.g., a two-hour tape) in six-hour mode. The actual quality of the copy will be set by the device manufacturer. The diminished quality signal output to the display device can be achieved using a number of methods. One example means for reducing signal quality is described as follows. If the original clean signal 6 was encoded to display images at a resolution of 1920 pixels per line, the original signal 6 could be resampled to produce a second modified signal 15a having a maximum resolution of, for example, 250 pixels per line. Contemplated embodiments also include second modified signals 15a which have been resampled to resolutions of about 400 or 500 pixels per line. It is to be understood that the pixels per line resolution can be really adjusted to any level with the foregoing specific numbers merely being preferred embodiments. The idea being that the signal quality of the degraded second modified signal 15a is of reduced quality with respect to the original (high or normal quality) signal 6. The degraded second modified signal can be reduced in quality to a level equivalent to broadcast quality signal or VCR recorded quality signal. The preferred embodiment reduces the quality of the original signal to a quality roughly equivalent to that of a standard VHS tape recorded in six-hour mode.

Additionally, other ways of altering the original video signal 6 to provide the second modified signal may be used. Where an encoded image is encoded using an MPEG format, macroblocks are used as an encoding component of image frames. Each macroblock comprising a 16×16 pixel segment within the image. Each pixel has a luminance component Y and two chrominance components Cr, Cb. Each pixel has a unique luminance value. Whereas, each group of four pixels has a chrominance value for red and also a chrominance value for blue. Thus, a 16×16 pixel macro block includes 256 values for luminance and only 64 values for red chrominance and 64 values for blue chrominance. These values for luminance and chrominance are digitally encoded at some resolution (for example, 32-bit resolution). The second signal modification element 15 can be used to reduce the picture quality of the second modified signal 7a output to a reproduction device 11. In one implementation, the pixel resolution can be reduced. For example, using one luminance value for every four pixels instead of for each pixel. The chrominance resolution can also be reduced. For example, using one chrominance value can be used for each 16 pixels rather than one value for each four pixels. These reductions in luminance and chrominance can be further reduced to levels where each macroblock only has four luminance values and only one chrominance value for each, red and blue. Still further reductions in luminance and chrominance resolution can be implemented.

Another method of producing a second modified signal having lowered picture quality is to encode each of the values, luminance Y, chrominance red Cr, and chrominance blue Cb, having a lower bit resolution. For example, instead of using 32-bit color, 16-bit values can be used. Alternatively, still lower resolution can be used. The same lowering of bit values or brightness resolution can be applied to luminance Y. Additionally, the color values themselves can be altered to non-true values. Slight alterations of this sort will allow the viewer to reproduce reasonable representation of the original, but not to produce a salable quality copy of the original.

Additionally, where the content includes sound, the sound quality can be reduced in the second modified signal 7a. For example, instead of a 20-bit resolution on the sound track, a 12-bit resolution could be used. Also, sound can be compressed at the high and low ends, introducing a certain amount of distortion, which will allow the user to understand the content but only produce lower quality copies. Also, a certain amount of noise or hiss can be introduced into the audio signal. Additionally, an original sound track in quadraphonic or stereo mode could be reduced to mono.

Also, the quality of the second modified signal 7a could be reduced by adding white noise to the sound track or to the video signal. Such noise could reduce the video quality to that of a broadcast signal having a certain amount of "snow" and the audio signal to some slightly distorted level.

Figure 3B:
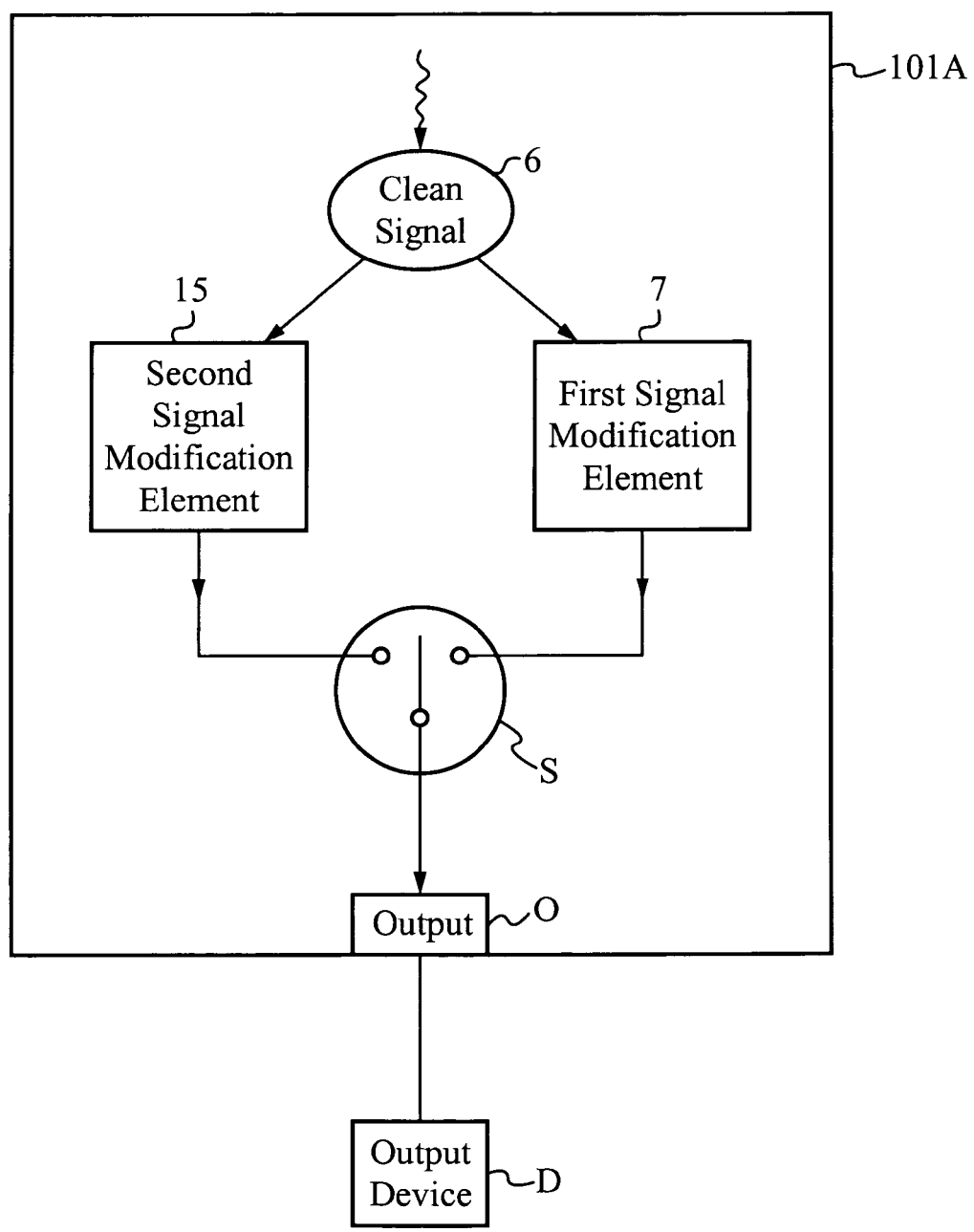
FIG. 3B is a block diagram of a switchable copy protection embodiment constructed in accordance with the principles of the present invention.

An embodiment 101A of the present invention is depicted in FIG. 3B. The device depicted in FIG. 3B includes a clean (decoded) signal 6. As with the embodiment of FIG. 3A, the clean signal is a high or normal quality video signal reproduced with all the resolution and fidelity of the original. The depicted embodiment shows the signal being forwarded to a first signal modification element 7, which modifies the signal to create a first modified signal. As with the previously discussed embodiment, the first modified signal is viewable on a display device, but produces an unusable copy when recorded by a reproduction device. As with the prior depicted embodiments, the clean signal 6 is also forwarded to a second signal modification element 15, where it is subjected to a second type of signal modification to produce a degraded second modified signal.

Both the first modified signal and the second modified signal are output into a switch element S that can be used to select which signal is output to an output port O. The signal is then output to an output device D. As disclosed previously, such output devices D can include display devices and/or reproduction devices. Thus, either output (the first modified signal or the second modified signal) can be switchably engaged for output to an output device D.

Figure 4:
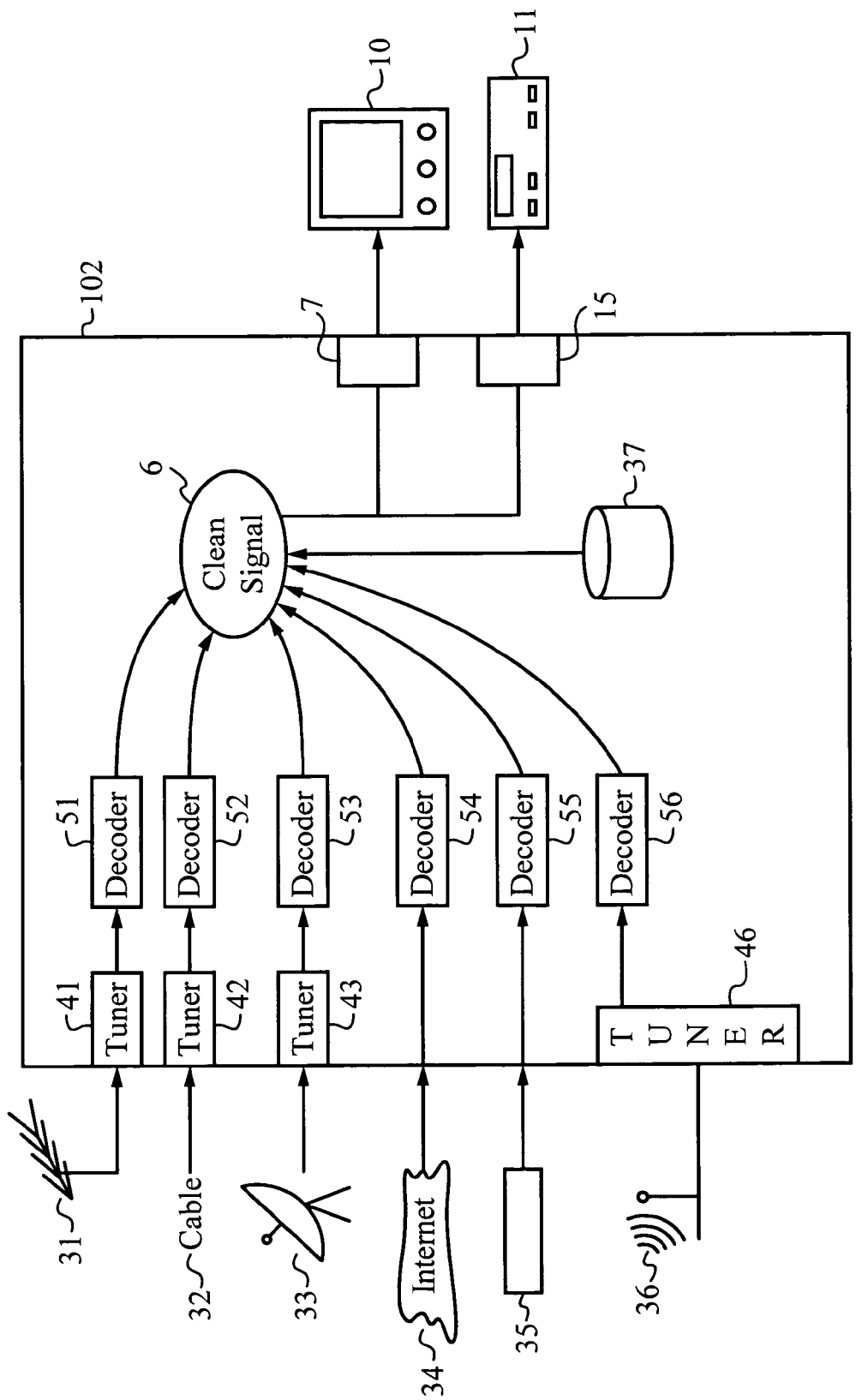
FIG. 4 is a block diagram of another copy protection embodiment in accordance with the principles of the present invention.

Such systems can be incorporated with a wide range of video content sources. FIG. 4 illustrates an embodiment that includes, without limitation, a number of implementations on a single machine 102. For example, a television broadcast signal can be received by an antenna 31, which feeds a signal into a tuner element 41. This signal is then decoded 51 to produce a clean signal 6. Likewise, cable programming 32 can be received and fed into a tuner 42, which selects the appropriate programming, at which point the signal is decoded 52 and a clean signal 6 is produced. Analogously, a satellite signal can be received 33, tuned 43, decoded 53, and used to produce a clean signal 6. Also, content can be directed from the internet 34 into a decoder 54 to produce a clean signal 6. Also, the device 102 can incorporate playback devices 35, such as DVD players, VCR's, and the like. The device 102 can also be interconnected to a network of devices via a connector, such as a standard connector or a 1394 line. A signal can be retrieved from networked devices 35 and decoded 55 (if necessary) to produce a clean signal 6. Another content source is simply a broadcast radio signal received by an antenna 36, which is passed through a tuner 46, decoded 56, to produce a clean signal 6. Alternatively, content can be taken off of a disk drive 37, either in decoded format or encoded format, which is then processed to produce a clean signal 6. As with the embodiment shown in FIG. 3A, the clean signal is passed through a first signal modification device 7, which provides a first modified signal. As explained with respect to FIG. 2, the first modified signal can be displayed by a display device 10 without distortion. As also explained with respect to FIG. 2, the first modified signal has a distortion introduced which prevents its use by output devices designed to produce copies of the signal. The clean signal 6 is also introduced into a second signal modification element 15, which introduces a measured degradation of the signal allowing reproductions of the content to be produced. The general idea being that the reproductions will be of a watchable but unsalable quality.

Figure 5:
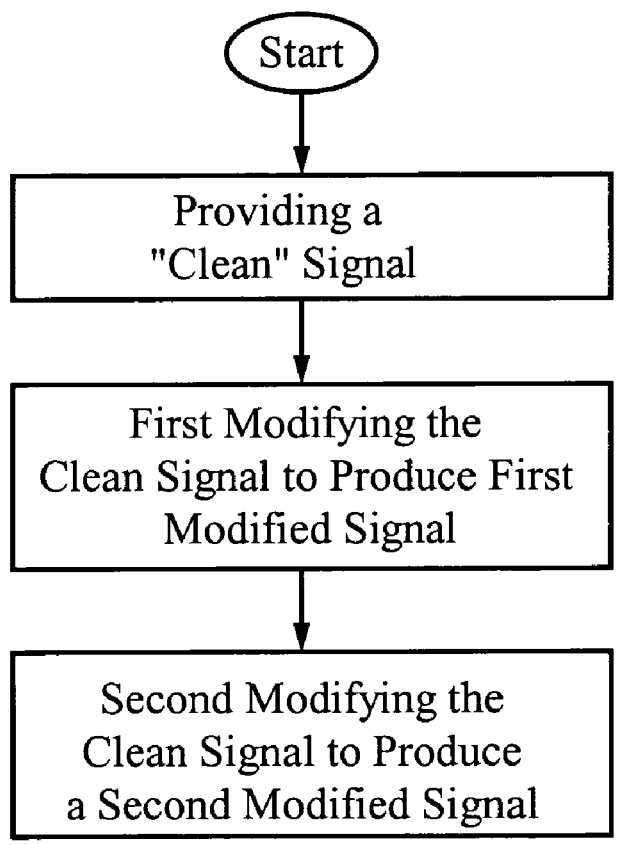
FIG. 5 is a flow diagram illustrating a method embodiment in accordance with the principles of the present invention.

FIG. 5 depicts a flow diagram illustrating aspects of a method embodiment of the present invention. A "clean" signal is provided 61. This means a normal (high) quality signal without any copy protection. Typically, this clean signal is provided by decoding an encoded video signal as described hereinabove. The clean signal is subjected to a first signal modification 63 which alters the clean signal. It can be displayed as a high quality video signal on a display device, but the first signal modification is such that the resulting signal is unsuitable for copying using a reproduction device. This first modified signal can be output to a first output. Also, the clean signal is subjected to a second modification 65 which alters the clean signal to produce a degraded second modified signal having reduced quality relative to the clean signal. This second modified signal can be output to a second output. The second output can be output to a reproduction device for the making of personal use copies. Alternatively, the first and second modified signals can be switchably engaged and output to a selected output device.

The present invention has been particularly shown and described with respect to certain preferred embodiments and specific features thereof. However, it should be readily apparent to those of ordinary skill in the art that various changes and modifications in form and detail may be made without departing from the spirit and scope of the invention as set forth in the appended claims. In particular, it should be noted that the inventors contemplate that many forms of quality reduction (other than those specifically mentioned) can be performed by the second modification of the clean signal to achieve a degraded second modified signal in accordance with the principles of the present invention. Further, reference in the claims to an element in the singular is not intended to mean "one and only one" unless explicitly stated, but rather, "one or more". The examples provided herein are intended to be illustrative rather than limiting. The inventions illustratively disclosed herein may be practiced without any element which is not specifically disclosed herein.

I claim:

1. An apparatus for processing a video signal to produce normal quality video for display on a display device and so as to inhibit the making of high quality reproductions therefrom while allowing lower quality reproductions to be made, the apparatus comprising:
    a first signal modification element which alters the video signal to produce a first modified video signal that is viewable as normal quality video on the display device, and wherein the first modified video signal, if reproduced, produces a video copy of unusable quality; and
    a second signal modification element which alters the video signal to produce a second modified video signal of reduced quality that can be reproduced using a reproduction device, wherein the second signal modification element alters the video signal by reducing the quality of the second video signal to a level equivalent to an analog video signal.

2. An apparatus for processing a video signal to produce normal quality video for display on a display device and so as to inhibit the making of high quality reproductions therefrom while allowing lower quality reproductions to be made, the apparatus comprising:
    a first signal modification element which alters the video signal to produce a first modified video signal that is viewable as normal quality video on the display device, and wherein the first modified video signal, if reproduced, produces a video copy of unusable quality; and
    a second signal modification element which alters the video signal to produce a second modified video signal of reduced quality that can be reproduced using a reproduction device, wherein the second signal modification element alters the video signal by reducing the quality of the second video signal to a level equivalent to a broadcast quality video signal.

3. An apparatus for processing a video signal to produce normal quality video for display on a display device and so as to inhibit the making of high quality reproductions therefrom while allowing lower quality reproductions to be made, the apparatus comprising:
    a first signal modification element which alters the video signal to produce a first modified video signal that is viewable as normal quality video on the display device, and wherein the first modified video signal, if reproduced, produces a video copy of unusable quality; and
    a second signal modification element which alters the video signal to produce a second modified video signal of reduced quality that can be reproduced using a reproduction device, wherein the second signal modification element alters the video signal by reducing the quality of the second video signal to a level equivalent to that achievable using a standard VCR tape in six-hour mode.

4. An apparatus for processing a video signal to produce normal quality video for display on a display device and so as to inhibit the making of high quality reproductions therefrom while allowing lower quality reproductions to be made, the apparatus comprising:
    a first signal modification element which alters the video signal to produce a first modified video signal that is viewable as normal quality video on the display device, and wherein the first modified video signal, if reproduced, produces a video copy of unusable quality; and
    a second signal modification element which alters the video signal to produce a second modified video signal of reduced quality that can be reproduced using a reproduction device, wherein the second signal modification element alters the video signal by using fewer data bits to encode pixel information to produce the second modified video signal.

5. An apparatus as in claim 4 wherein the second signal modification element alters the video signal by reducing picture resolution by reducing the number of pixels per line.

6. An apparatus as in claim 5 wherein the second signal modification element alters the video signal by reducing picture resolution to about 500 pixels per line.

7. An apparatus as in claim 5 wherein the second signal modification element alters the video signal by reducing picture resolution to about 400 pixels per line.

8. An apparatus as in claim 5 wherein the second signal modification element alters the video signal by reducing picture resolution to about 200 pixels per line.

9. An apparatus as in claim 4 wherein the second signal modification element alters the video signal by using fewer luminance components per macroblock to produce the second modified video signal.

10. An apparatus as in claim 4 wherein the second signal modification element alters the video signal by using fewer chrominance components per macroblock to produce the second modified video signal.

11. An apparatus as in claim 4 wherein the first modified signal is output to a first output port and the second modified signal is output to a second output port.

12. An apparatus as in claim 4 wherein the first modified signal and the second modified signal are output into a switching element enabling switching between the first modified signal and the second modified signal and supplying a selected one of the first modified signal and the second modified signal to an output port.

13. An apparatus for processing a video signal so as to inhibit the making of high quality videotape recordings therefrom while producing a normal picture on a display device, the apparatus comprising:
   a video decoder for decoding a video signal to provide a clean video signal;
   a first signal modification element which alters the clean video signal to produce a first modified video signal which is of unusable quality when output for reproduction thereby inhibiting the making of usable copies therefrom, and wherein the first modified video signal is viewable as high quality video when displayed on a display device; and
   a second signal modification element which alters the clean video signal such that a reduced quality version of the content is produced and output for reproduction, wherein the second signal modification element includes a signal quality reducing means for altering the clean video signal to produce a signal having reduced signal quality.

14. An apparatus as in claim 13 wherein the second signal modification element alters the video signal by reducing the quality of the second video signal to a level equivalent to a broadcast quality video signal.

15. An apparatus as in claim 13 wherein the second signal modification element alters the video signal by reducing the quality of the second video signal to a level equivalent to that achievable using a standard VHS tape in six-hour mode.

16. An apparatus as in claim 13 wherein the second signal modification element alters the video signal by reducing picture resolution to a level which is less that the resolution of the clean signal but greater than about 200 pixels per line.

17. A method for processing a video signal so that it produces a normal quality picture on a display device but produces a reduced quality copy when reproduced using a reproduction device, the method comprising:
   providing a clean video signal, wherein providing a clean video signal includes receiving an encoded video signal and decoding the encoded video signal to produce the clean video signal;
   first modifying of the clean video signal to produce a first modified signal that is of unusable quality when output for reproduction and is viewable as high quality video when output to a display device; and
   second modifying of the clean video signal to produce a degraded second modified signal having reduced signal quality when output for reproduction.

18. A method as in claim 17 wherein the second modifying of the clean video signal to produce a degraded second modified signal includes degrading the clean video signal to a quality level equivalent to that recordable on a standard VHS tape in six-hour mode.

19. A method as in claim 17 wherein the second modifying of the clean video signal to produce a degraded second modified signal includes degrading the clean video signal to a level equivalent to a broadcast quality video signal.

20. A method as in claim 17 wherein the second modifying of the clean video signal to produce a degraded second modified signal includes degrading the clean video signal to a level equivalent to a VHS quality video signal.

21. A method as in claim 17 wherein the second modifying of the clean video signal to produce a degraded second modified signal includes degrading the clean video signal by reducing the number of pixels per line in each picture.

22. A method as in claim 17 wherein the second modifying of the clean video signal to produce a degraded second modified signal includes degrading the clean video signal by reducing the number of luminance components and chrominance components per macroblock.

23. A method as in claim 17 wherein the second modifying of the clean video signal to produce a degraded second modified signal includes degrading the clean video signal by using fewer data bits to encode pixel information.

* * * * *